United States Patent
Li et al.

(10) Patent No.: US 10,197,306 B2
(45) Date of Patent: Feb. 5, 2019

(54) HEAT PUMP SYSTEM, HEAT PUMP UNIT USING THE SAME, AND METHOD FOR CONTROLLING MULTIPLE FUNCTIONAL MODES THEREOF

(71) Applicant: Carrier Corporation, Farmington, CT (US)

(72) Inventors: Haijun Li, Shanghai (CN); Weijuan Wang, Shanghai (CN); Guangyu Shen, Shanghai (CN)

(73) Assignee: CARRIER CORPORATION, Farmington, CT (US)

( * ) Notice: Subject to any disclaimer, the term of this patent is extended or adjusted under 35 U.S.C. 154(b) by 268 days.

(21) Appl. No.: 14/911,927

(22) PCT Filed: Jun. 13, 2014

(86) PCT No.: PCT/US2014/042289
§ 371 (c)(1),
(2) Date: Feb. 12, 2016

(87) PCT Pub. No.: WO2015/023354
PCT Pub. Date: Feb. 19, 2015

(65) Prior Publication Data
US 2016/0195311 A1 Jul. 7, 2016

(30) Foreign Application Priority Data

Aug. 14, 2013 (CN) .......................... 2013 1 0352607

(51) Int. Cl.
*F25B 13/00* (2006.01)
*F24D 11/02* (2006.01)
(Continued)

(52) U.S. Cl.
CPC .......... *F25B 13/00* (2013.01); *F24D 11/0214* (2013.01); *F24D 19/1039* (2013.01);
(Continued)

(58) Field of Classification Search
CPC . F25B 13/00; D24D 11/0214; D24D 19/1039; D24D 200/123; F24H 4/049; F24H 4/04; Y02B 30/126
See application file for complete search history.

(56) References Cited

U.S. PATENT DOCUMENTS 4,598,557 A   7/1986 Robinson et al.
4,693,089 A   9/1987 Bourne et al.
(Continued)

FOREIGN PATENT DOCUMENTS

CN   101307939 A   11/2008
CN   101476760 A    7/2009
(Continued)

OTHER PUBLICATIONS

International Search Report and Written Opinion for application PCT/US2014/042289 dated Oct. 30, 2014, 9 pages.
(Continued)

*Primary Examiner* — Elizabeth J Martin
(74) *Attorney, Agent, or Firm* — Cantor Colburn LLP (57) ABSTRACT

A heat pump system, a controlling method thereof, and a heat pump unit using the heat pump system. The heat pump system includes a compressor, a first heat exchanger, a second heat exchanger, a heat-recovery-type heat exchanger, a multi-way valve, a throttling element, and a mode-switching flow path, which has both air conditioning and water heating functions. By switching the multi-way valve and powering on/off electromagnetic valves in the heat pump system, the controlling method controls the heat pump system to implement multiple functional modes. Furthermore, the heat pump unit using the heat pump system provides multiple functions simply by laying a small amount of parts and elements and pipelines outdoors, thereby greatly (Continued)

reducing the engineering cost and cost of parts, and ensuring a much higher water heating efficiency.

20 Claims, 2 Drawing Sheets (51) Int. Cl.
F24D 19/10 (2006.01)
F24H 4/04 (2006.01)
(52) U.S. Cl.
CPC ......... *F24H 4/04* (2013.01); *F24D 2200/123* (2013.01); *F25B 2313/0272* (2013.01); *F25B 2313/02742* (2013.01); *Y02A 30/62* (2018.01); *Y02B 30/125* (2018.05)

(56) References Cited

U.S. PATENT DOCUMENTS

| | | | |
|---|---|---|---|
| 4,727,727 A | 3/1988 | Reedy | |
| 4,766,734 A | 8/1988 | Dudley | |
| 5,465,588 A | 11/1995 | McCahill et al. | |
| 5,755,104 A | 5/1998 | Rafalovich et al. | |
| 5,782,104 A | 7/1998 | Sami et al. | |
| 5,906,104 A | 5/1999 | Schwartz et al. | |
| 5,984,198 A | 11/1999 | Bennett et al. | |
| 6,050,102 A | 4/2000 | Jin | |
| 6,109,339 A | 8/2000 | Talbert et al. | |
| 6,123,147 A | 9/2000 | Pittman | |
| 6,357,245 B1 | 3/2002 | Weng et al. | |
| 6,378,318 B1 | 4/2002 | Jin | |
| 6,679,321 B2 | 1/2004 | Jin | |
| 7,454,919 B2 | 11/2008 | Ookoshi | |
| 8,056,348 B2 | 11/2011 | Murakami et al. | |
| 8,074,459 B2 | 12/2011 | Murakami et al. | |
| 8,079,229 B2 | 12/2011 | Lifson et al. | |
| 8,220,531 B2 | 7/2012 | Murakami et al. | |
| 8,385,729 B2 | 2/2013 | Kleman et al. | |
| 2010/0243202 A1* | 9/2010 | Han | F24D 3/18 165/62 |
| 2012/0067074 A1 | 3/2012 | Lesage | |
| 2012/0222631 A1 | 9/2012 | Lesage | |
| 2013/0076033 A1 | 3/2013 | Zachary | |
| 2014/0096557 A1* | 4/2014 | Higashiiue | F25B 13/00 62/324.6 |
| 2014/0123689 A1* | 5/2014 | Ellis | F25B 13/00 62/79 |

FOREIGN PATENT DOCUMENTS

| | | |
|---|---|---|
| CN | 101571330 A | 11/2009 |
| CN | 101799227 A | 8/2010 |
| CN | 201772675 U | 3/2011 |
| CN | 201779919 U | 3/2011 |
| CN | 102022856 A | 4/2011 |
| CN | 201885482 U | 6/2011 |
| CN | 102221251 A | 10/2011 |
| CN | 202008252 U | 10/2011 |
| CN | 102278836 A | 12/2011 |
| CN | 102338500 A | 2/2012 |
| CN | 102393054 A | 3/2012 |
| CN | 202171273 U | 3/2012 |
| CN | 202328901 U | 7/2012 |
| CN | 202382477 U | 8/2012 |
| CN | 102809236 A | 12/2012 |
| CN | 202813932 U | 3/2013 |
| CN | 202869074 U | 4/2013 |
| CN | 202915600 U | 5/2013 |
| CN | 202928189 U | 5/2013 |
| EP | 2224188 A2 | 9/2010 |
| EP | 2549193 A1 | 1/2013 |
| EP | 2592358 A1 | 5/2013 |
| EP | 2610559 A2 | 7/2013 |
| RO | 126049 | 2/2011 |
| WO | 9951919 A1 | 10/1999 |
| WO | 03050457 A1 | 6/2003 |

OTHER PUBLICATIONS

Chinese First Office Action and Search Report for application CN 201310352607.1, dated Dec. 14, 2017, 16 pages.

* cited by examiner

HEAT PUMP SYSTEM, HEAT PUMP UNIT USING THE SAME, AND METHOD FOR CONTROLLING MULTIPLE FUNCTIONAL MODES THEREOF

BACKGROUND

Technical Field

The present invention relates to a heat pump system, and more particularly to a heat pump system having multiple functional modes such as an air conditioning mode, a water heating mode, etc.

Related Art

Figure 1:
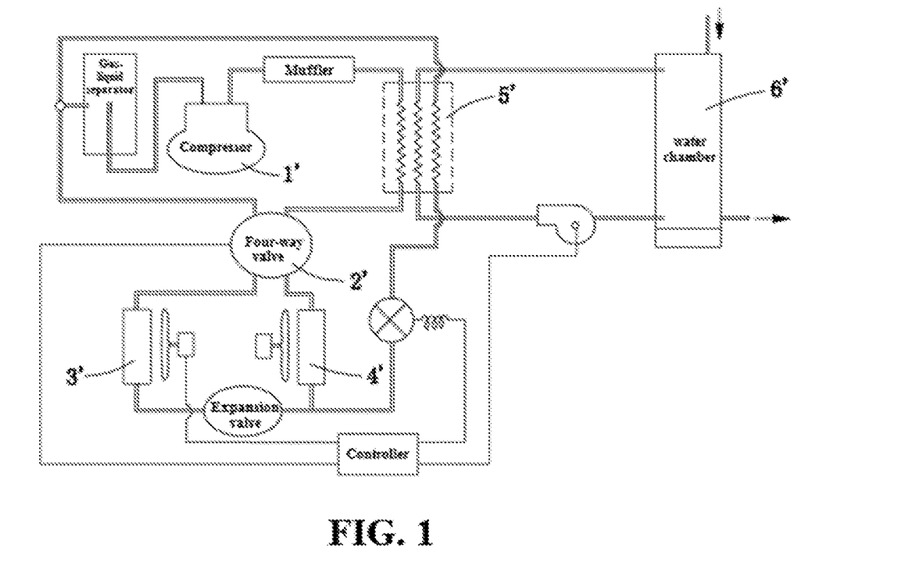
FIG. 1 is a schematic view of a heat pump system in the prior art.

U.S. Pat. No. 4,766,734A has disclosed a heat pump system with a water heating function. As shown in FIG. 1, the heat pump system includes a compressor 1', a four-way valve 2', an evaporator 3', a throttling element and a condenser 4', and so on. In order to further provide the water heating function, generally, a heat exchanger 5' is further disposed on a pipeline connected with an outlet of the compressor. The water in a water chamber 6' is guided to the heat exchanger 5' for heat exchanging, to generate hot water with a higher temperature. In the heat pump system, high-temperature refrigerants discharging from the outlet of the compressor 1' all pass through the heat exchanger 5' and exchange heat with the water, so that the refrigerants waste a part of heat energy. Thus, if a user only needs a conventional air conditioning mode, instead of the water heating mode, the air conditioning performance is affected in the heat pump system. Therefore, functional modes of the heat pump system are neither mature, nor highly efficient.

In the prior art, a heat pump unit integrated with air conditioning and water heating functions not only uses the heat pump system as shown in FIG. 1, but also uses multiple water systems to transfer heat to a user side or transfer heat to outdoor water source or ground source, thereby making full use of usable energy or releasing unusable energy. The heat pump unit has too many sub systems (including a plurality of water systems and heat pump systems). As a result, on one hand, it has a much higher cost of elements and parts. On the other hand, it further increases complexity on laying pipelines and increases labor cost. What's worse, the more complicated the systems are, the more professional and difficult the repairing and maintenance work will be, so that the heat pump unit is rather inconvenient for being used by users.

SUMMARY

Accordingly, an object of the present invention is to provide a heat pump system, having multiple functional modes such as high-performance air conditioning and water heating modes by laying pipelines. Another object of the present invention is to provide a method for controlling a heat pump system, having five running functional modes such as high-performance air conditioning and water heating modes. Still another object of the present invention is to provide a heat pump unit using the heat pump system, which has simple outdoor pipeline structures and requests a smaller amount of parts.

According to an aspect of the present invention, the present invention provides a heat pump system, which includes a compressor, a first heat exchanger, a second heat exchanger, a heat-recovery-type heat exchanger, a multi-way valve, and throttling elements. Flow paths between any two of the first heat exchanger, the second heat exchanger, and the heat-recovery-type heat exchanger are disposed with the throttling elements. The heat pump system of the present invention further includes a mode-switching flow path. The mode-switching flow path is further disposed with a first flow path, a second flow path, a third flow path, and a fourth flow path. Each of the flow paths is controllably turned on or off to provide corresponding different functional modes. Specifically, in a cooling mode, a cooling medium sequentially circulates through an outlet of the compressor, the multi-way valve, the first heat exchanger, the first flow path of the mode-switching flow path, the second heat exchanger, and the multi-way valve, and reaches an inlet of the compressor; and/or in a heating mode, the cooling medium sequentially circulates through the outlet of the compressor, the multi-way valve, the second heat exchanger, the second flow path of the mode-switching flow path, the first heat exchanger, and the multi-way valve, and reaches the inlet of the compressor; and/or in a heat recovery mode, the cooling medium sequentially circulates through the outlet of the compressor, the multi-way valve, the heat-recovery-type heat exchanger, the third flow path of the mode-switching flow path, the second heat exchanger, and the multi-way valve, and reaches the inlet of the compressor; and/or in a water heating mode, the cooling medium sequentially circulates through the outlet of the compressor, the multi-way valve, the heat-recovery-type heat exchanger, the fourth flow path of the mode-switching flow path, the first heat exchanger, and the multi-way valve, and reaches the inlet of the compressor.

Furthermore, the mode-switching flow path includes a first three-way port, a second three-way port, a third three-way port, and a four-way port. The throttling elements are disposed in the mode-switching flow path. The first flow path of the mode-switching flow path is a flow path from the first three-way port to the third three-way port through the throttling element; and/or the second flow path of the mode-switching flow path is a flow path from the third three-way port to the first three-way port through the throttling element; and/or the third flow path of the mode-switching flow path is a flow path from the four-way port to the third three-way port through the throttling element; and/or the fourth flow path of the mode-switching flow path is a flow path from the four-way port to the first three-way port through the throttling element.

Furthermore, the first flow path of the mode-switching flow path is a flow path starting from the first three-way port, passing through the four-way port, the throttling element, and the second three-way port, and reaching the third three-way port; and/or the second flow path of the mode-switching flow path is a flow path starting from the third three-way port, passing through the four-way port, the throttling element, and the second three-way port, and reaching the first three-way port; and/or the third flow path of the mode-switching flow path is a flow path starting from the four-way port, passing through the throttling element and the second three-way port, and reaching the third three-way port; and/or the fourth flow path of the mode-switching flow path is a flow path starting from four-way port, passing through the throttling element and the second three-way port, and reaching the first three-way port.

Furthermore, a first end of the first three-way port is connected with the first heat exchanger, a second end of the first three-way port is connected with a first end of the second three-way port via a first electromagnetic valve, and a third end of the first three-way port is connected with a first end of the four-way port via a first check valve. A second end of the second three-way port is connected with a first end of the third three-way port via a second electromagnetic valve, and a third end of the second three-way port is connected with a third end of the four-way port via the throttling element. A second end of the third three-way port is connected with the second heat exchanger, and a third end of the third three-way port is connected with a second end of the four-way port by a second check valve. A fourth end of the four-way port is connected with the heat-recovery-type heat exchanger via a third check valve.

Furthermore, the multi-way valve has a first switching position, a second switching position, a third switching position, and a fourth switching position. In the first switching position, the multi-way valve respectively communicates the outlet of the compressor with the first heat exchanger, and communicates the inlet of the compressor with the second heat exchanger, and/or in the second switching position, the multi-way valve respectively communicates the outlet of the compressor with the second heat exchanger, and communicates the inlet of the compressor with the first heat exchanger; and/or in the third switching position, the multi-way valve respectively communicates the outlet of the compressor with the heat-recovery-type heat exchanger, and communicates the inlet of the compressor with the second heat exchanger; and/or in the fourth switching position, the multi-way valve respectively communicates the outlet of the compressor with the heat-recovery-type heat exchanger; and communicates the inlet of the compressor with the first heat exchanger.

Furthermore, the multi-way valve respectively includes a first four-way valve and a second four-way valve that are connected with each other. In the first switching position, the first four-way valve and the second four-way valve communicate the outlet of the compressor with the first heat exchanger, and communicate the inlet of the compressor with the second heat exchanger; and/or in the second switching position, the first four-way valve and the second four-way valve communicate the outlet of the compressor with the second heat exchanger, and communicate the inlet of the compressor with the first heat exchanger; and/or in the third switching position, the first four-way valve and the second four-way valve communicate the outlet of the compressor with the heat-recovery-type heat exchanger, and communicate the inlet of the compressor with the second heat exchanger; and/or in the fourth switching position, the first four-way valve and the second four-way valve communicate the outlet of the compressor with the heat-recovery-type heat exchanger, and communicate the inlet of the compressor with the first heat exchanger.

Furthermore, the first four-way valve has an a1 port, a b1 port, a c1 port, and a d1 port. The second four-way valve has an a2 port, a b2 port, a c2 port, and a d2 port. The a1 port is connected with the outlet of the compressor. The b1 port is connected with the heat-recovery-type heat exchanger. The c1 port is connected with the inlet of the compressor. The d1 port is connected with the a2 port. The b2 port is connected with the first heat exchanger. The c2 port is connected with the inlet of the compressor. The d2 port is connected with the second heat exchanger. In the first switching position, the a1 port is communicated with the d1 port, the b1 port is communicated with the c1 port, the a2 port is communicated with the b2 port, and the c2 port is communicated with the d2 port. And/or in the second switching position, the a1 port is communicated with the d1 port, the b1 port is communicated with the c1 port, the a2 port is communicated with the d2 port, and the b2 port is communicated with the c2 port. And/or in the third switching position, the a1 port is communicated with the b1 port, the c1 port is communicated with the d1 port, the a2 port is communicated with the b2 port, and the c2 port is communicated with the d2 port. And/or in the fourth switching position, the a1 port is communicated with the d1 port, the b1 port is communicated with the c1 port, the a2 port is communicated with the d2 port, and the b2 port is communicated with the c2 port.

Furthermore, a fourth check valve is disposed between the first electromagnetic valve and the second end of the first three-way port; and/or a fifth check valve is disposed between the second electromagnetic valve and the first end of the third three-way port.

Furthermore, a liquid storage tank is disposed between the throttling element and the third end of the four-way port.

Furthermore, a gas-liquid separator is disposed between the multi-way valve and the inlet of the compressor.

Furthermore, the throttling elements are electronic expansion valve.

According to another aspect of the present invention, the present invention further provides a heat pump unit, which includes the heat pump system mentioned above, and further includes an indoor side system, a water chamber system, and a heat-exchanging side system. The indoor side system, the water chamber system, and the heat-exchanging side system are thermodynamically connected with the heat pump system via pipelines respectively.

Furthermore, the indoor side system includes a first water pump and an indoor-side heat exchanger. The indoor-side heat exchanger and the first water pump are thermodynamically connected with the second heat exchanger via pipelines.

Furthermore, the heat-exchanging side system includes a second water pump and a heat-exchanging side heat exchanger. The heat-exchanging side heat exchanger and the second water pump are thermodynamically connected with the first heat exchanger via pipelines.

Furthermore, the water chamber system includes a third water pump and a water chamber. The water chamber and the third water pump are thermodynamically connected with the heat-recovery-type heat exchanger via pipelines.

According to another aspect of the present invention, the present invention further provides a method for controlling multiple functional modes of a heat pump system, in which the heat pump system includes a compressor, a first heat exchanger, a second heat exchanger, a heat-recovery-type heat exchanger, a multi-way valve, throttling elements, and a mode-switching flow path. Any flow path between any two of the first heat exchanger, the second heat exchanger, and the heat-recovery-type heat exchanger is disposed with the throttling element. The mode-switching flow path is disposed with a first flow path, a second flow path, a third flow path, and a fourth flow path. When the heat pump system runs a cooling mode, the first flow path of the mode-switching flow path is turned on, and the second flow path, the third flow path, and the fourth flow path of the mode-switching flow path are turned off. In this case, a cooling medium sequentially circulates through an outlet of the compressor, the multi-way valve, the first heat exchanger, the first flow path of the mode-switching flow path, the second heat exchanger, and the multi-way valve, and reaches an inlet of the compressor. And/or when the heat pump system runs a heating mode, the second flow path of the mode-switching flow path is turned on, and the first flow path, the third flow path, and the fourth flow path of the mode-switching flow path are turned off. In this case, the cooling medium sequentially circulates through the outlet of the compressor, the multi-way valve, the second heat exchanger, the second flow path of the mode-switching flow path, the first heat exchanger, and the multi-way valve, and reaches the inlet of the compressor. And/or when the heat pump system runs a heat recovery mode, the third flow path of the mode-switching flow path is turned on, and the first flow path, the second flow path, and the fourth flow path of the mode-switching flow path are turned off. In this case, the cooling medium sequentially circulates through the outlet of the compressor, the multi-way valve, the heat-recovery-type heat exchanger, the third flow path of the mode-switching flow path, the second heat exchanger, and the multi-way valve, and reaches the inlet of the compressor. And/or when the heat pump system runs a water heating mode, the fourth flow path of the mode-switching flow path is turned on, and the first flow path, the second flow path, and the third flow path of the mode-switching flow path are turned off. In this case, the cooling medium sequentially circulates through the outlet of the compressor, the multi-way valve, the heat-recovery-type heat exchanger, the fourth flow path of the mode-switching flow path, the first heat exchanger, and the multi-way valve, and reaches the inlet of the compressor.

Furthermore, the mode-switching flow path is further disposed with a first electromagnetic valve and a second electromagnetic valve. When the first electromagnetic valve is powered off, the second electromagnetic valve is powered on, and the multi-way valve is switched to a first switching position, the first flow path of the mode-switching flow path is turned on, and the second flow path, the third flow path, and the fourth flow path of the mode-switching flow path are turned off. And/or when the second electromagnetic valve is powered off, the first electromagnetic valve is powered on, and the multi-way valve is switched to a second switching position, the second flow path of the mode-switching flow path is turned on, and the first flow path, the third flow path, and the fourth flow path of the mode-switching flow path are turned off. And/or when the first electromagnetic valve is powered off, the second electromagnetic valve is powered on, and the multi-way valve is switched to a third switching position, the third flow path of the mode-switching flow path is turned on and the first flow path, the second flow path, and the fourth flow path of the mode-switching flow path are turned off. And/or when the second electromagnetic valve is powered off, the first electromagnetic valve is powered on, and the multi-way valve is switched to a fourth switching position, the fourth flow path of the mode-switching flow path is turned on, and the first flow path, the second flow path, and the third flow path of the mode-switching flow path are turned off.

Furthermore, the mode-switching flow path includes a first three-way port, a second three-way port, a third three-way port, and a four-way port. A first end of the first three-way port is connected with the first heat exchanger, a second end of the first three-way port is connected with a first end of the second three-way port via the first electromagnetic valve, and a third end of the first three-way port is connected with a first end of the four-way port via a first check valve. A second end of the second three-way port is connected with a first end of the third three-way port via the second electromagnetic valve, and a third end of the second three-way port is connected with a third end of the four-way port via a throttling element. A second end of the third three-way port is connected with the second heat exchanger, and a third end of the third three-way port is connected with a second end of the four-way port via a second check valve. A fourth end of the four-way port is connected with the heat-recovery-type heat exchanger via a third check valve. When the first flow path of the mode-switching flow path is turned on, and the second flow path, the third flow path, and the fourth flow path of the mode-switching flow path are turned off, the cooling medium sequentially circulates through the first three-way port, the first check valve, the four-way port, the throttling element, the second three-way port, and the second electromagnetic valve, and reaches the third three-way port in the mode-switching flow path. And/or when the second flow path of the mode-switching flow path is turned on, and the first flow path, the third flow path, and the fourth flow path of the mode-switching flow path are turned off, the cooling medium sequentially circulates through the third three-way port, the second check valve, the four-way port, the throttling element, the second three-way port, and the first electromagnetic valve, and reaches the first three-way port in the mode-switching flow path. And/or when the third flow path of the mode-switching flow path is turned on, and the first flow path, the second flow path, and the fourth flow path of the mode-switching flow path are turned off, the cooling medium sequentially circulates through the third check valve, the four-way port, the throttling element, the second three-way port, and the second electromagnetic valve, and reaches the third three-way port in the mode-switching flow path. And/or when the fourth flow path of the mode-switching flow path is turned on, and the first flow path, the second flow path, and the third flow path of the mode-switching flow path are turned off, the cooling medium sequentially circulates through the third check valve, the four-way port, the throttling element, the second three-way port, the first electromagnetic valve, and reaches the first three-way port in the mode-switching flow path.

Furthermore, the method for controlling multiple functional modes of the heat pump system further includes a combined functional mode. The combined functional mode includes a preset condition, a first running mode, and a second running mode. The first running mode is any one of the cooling mode, the heating mode, the heat recovery mode, or the water heating mode. The second running mode is any other of the cooling mode, the heating mode, the heat recovery mode, or the water heating mode. When the heat pump system runs the combined functional mode, it runs the first running mode firstly, and then when the preset condition is satisfied, the system switches to run the second running mode.

Furthermore, the combined functional mode includes a heating and heat recovery mode, in which the first running mode is any one of the heating mode or the water heating mode, and the second running mode is another one of the heating mode or the water heating mode. When the heat pump system runs the heating and heat recovery mode, it runs the first running mode firstly, and then, when the preset condition is satisfied, it switches to the second running mode.

Furthermore, the preset condition is that an air temperature and/or hot water temperature is higher than or equals to a preset value.

According to the present invention, by means of improving the system structures, the heat pump system runs multiple functional modes such as a cooling mode, a heating mode, a heat recovery mode, a water heating mode, as well as a combined heating and heat recovery mode, which enhances functions of the system and increases the efficiency. Meanwhile, for the heat pump unit using the heat pump system, the number of elements and parts used by the heat pump unit is greatly reduced, the cost is lowered, and the complexity for laying pipelines is further reduced, and the difficulty and cost for project implementation are further decreased. The method according to the present invention can switch among multiple working modes simply by controlling to power on/off the multi-way valve and the electromagnetic valve, which is quite simple and highly efficient.

DETAILED DESCRIPTION

Figure 2:
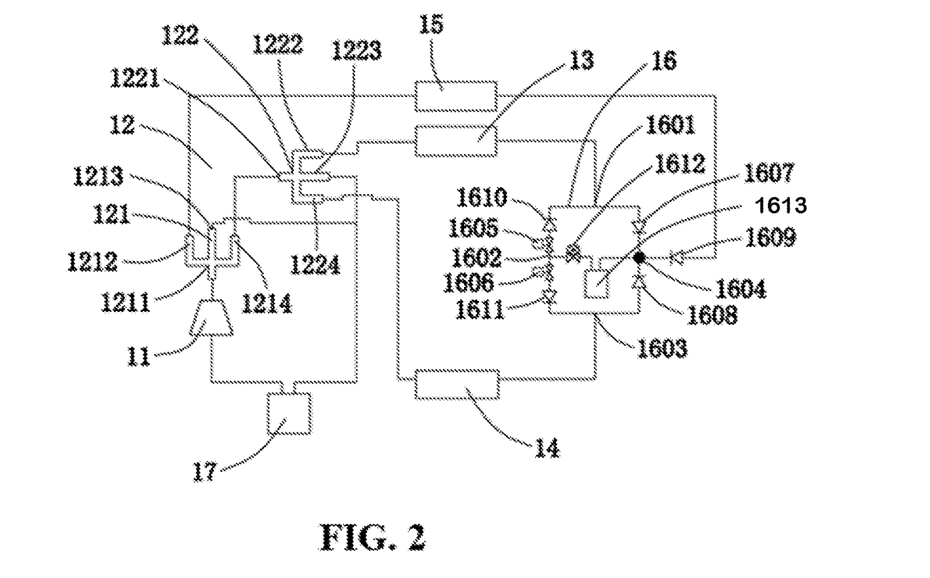
FIG. 2 is a schematic view of a heat pump system according to the present invention.

As shown in FIG. 2, according to an embodiment, the present invention provides a heat pump system 1. The heat pump system 1 includes a compressor 11, a multi-way valve 12, a first heat exchanger 13, a second heat exchanger 14, a heat-recovery-type heat exchanger 15, throttling elements 1612, and a mode-switching flow path 16.

The mode-switching flow path 16 is disposed with a first flow path, a second flow path, a third flow path, and a fourth flow path each having the throttling element 1612. Each of the flow paths can be controllably turned on or off to implement different functional modes. In a cooling mode, a cooling medium sequentially circulates through an outlet of the compressor 11, the multi-way valve 12, the first heat exchanger 13, the first flow path of the mode-switching flow path 16, the second heat exchanger 14, and the multi-way valve 12, and reaches an inlet of the compressor 11. And/or in a heating mode, the cooling medium sequentially circulates through the outlet of the compressor 11, the multi-way valve 12, the second heat exchanger 14, the second flow path of the mode-switching flow path 16, the first heat exchanger 13, and the multi-way valve 12, and reaches the inlet of the compressor 11. And/or in a heat recovery mode, the cooling medium sequentially circulates through the outlet of the compressor 11, the multi-way valve 12, the heat-recovery-type heat exchanger 15, the third flow path of the mode-switching flow path 16, the second heat exchanger 14, and the multi-way valve 12, and reaches the inlet of the compressor 11. And/or in a water heating mode, the cooling medium sequentially circulates through the outlet of the compressor 11, the multi-way valve 12, the heat-recovery-type heat exchanger 15, the fourth flow path of the mode-switching flow path 16, the first heat exchanger 13, and the multi-way valve 12, and reaches the inlet of the compressor 11.

According to the present invention, in the embodiment shown in FIG. 2, the mode-switching flow path 16 includes a first three-way port 1601, a second three-way port 1602, a third three-way port 1603, and a four-way port 1604. The first flow path of the mode-switching flow path 16 is a flow path from the first three-way port 1601 to the third three-way port 1603 through the throttling element 1612. And/or the second flow path of the mode-switching flow path 16 is a flow path from the third three-way port 1603 to the first three-way port 1601 through the throttling element 1612. And/or the third flow path of the mode-switching flow path 16 is a flow path from the four-way port 1604 to the third three-way port 1603 through the throttling element 1612. And/or the fourth flow path of the mode-switching flow path 16 is a flow path from the four-way port 1604 to the first three-way port 1601 through the throttling element 1612.

Optionally, the first flow path of the mode-switching flow path 16 is a flow path starting from the first three-way port 1601, passing through the four-way port 1604, the throttling element 1612, and the second three-way port 1602, and reaching the third three-way port 1603. And/or the second flow path of the mode-switching flow path 16 is a flow path starting from the third three-way port 1603, passing through the four-way port 1604, the throttling element 1612, and the second three-way port 1602, and reaching the first three-way port 1601. And/or the third flow path of the mode-switching flow path 16 is a flow path starting from the four-way port 1604, passing through the throttling element 1612, and the second three-way port 1602, and reaching the third three-way port 1603. And/or the fourth flow path of the mode-switching flow path 16 is a flow path starting from the four-way port 1604, passing through the throttling element 1612 and the second three-way port 1602, and reaching the first three-way port 1601.

According to the present invention, in the embodiment of FIG. 2, one connection mode between parts in the mode-switching flow path is specifically shown. A first end of the first three-way port 1601 is connected with the first heat exchanger 13. A second end of the first three-way port 1601 is connected with a first end of the second three-way port 1602 via a first electromagnetic valve 1605. A third end of the first three-way port 1601 is connected with a first end of the four-way port 1604 via a first check valve 1607. A second end of the second three-way port 1602 is connected with a first end of the third three-way port 1603 via a second electromagnetic valve 1606. A third end of the second three-way port 1602 is connected with a third end of the four-way port 1604 via the throttling element 1612. A second end of the third three-way port 1603 is connected with the second heat exchanger 14. A third end of the third three-way port 1603 is connected with a second end of the four-way port 1604 via the second check valve 1608. A fourth end of the four-way port 1604 is connected with the heat-recovery-type heat exchanger 15 via a third check valve 1609.

Optionally, the multi-way valve 12 of the heat pump system 1 has a first switching position, a second switching position, a third switching position, and a fourth switching position. In the first switching position, the multi-way valve 12 respectively communicates the outlet of the compressor 11 with the first heat exchanger 13, and communicates the inlet of the compressor 11 with the second heat exchanger 14. In the second switching position, the multi-way valve 12 respectively communicates the outlet of the compressor 11 with the second heat exchanger 14, and communicates the inlet of the compressor 11 with the first heat exchanger 13. In the third switching position, the multi-way valve 12 respectively communicates the outlet of the compressor 11 with the heat-recovery-type heat exchanger 15, and communicates the inlet of the compressor 11 with the second heat exchanger 14. In the fourth switching position, the multi-way valve 12 respectively communicates the outlet of the compressor 11 with the heat-recovery-type heat exchanger 15, and communicates the inlet of the compressor 11 with the first heat exchanger 13.

By means of being powered on or off, the multi-way valve 12 is controlled to switch its location, and the first electromagnetic valve 1605 and the second electromagnetic valve 1606 in the mode-switching flow path 16 are controlled to be turned on or off, to offer four different flowing loops for a refrigerant, thereby producing four different working modes of air conditioning and/or water heating.

According to the present invention, the multi-way valve may be a five-way valve or two four-way valves or any other single value or a combination of multiple valves satisfying the pipeline connections restricted in the present invention, that is, the multi-way valve can be respectively connected with the inlet and the outlet of the compressor 11, the first heat exchanger 13, the second heat exchanger 14, and the heat-recovery-type heat exchanger 15 mentioned in this embodiment, in which multiple specific connection modes can be used. In this embodiment, a preferable connection mode is further used. According to the following descriptions about the preferable connection mode, persons in the art can easily make modifications and variations on the connections between each port of the multi-way valve 12 with the inlet and the outlet of the compressor 11, the first heat exchanger 13, the second heat exchanger 14, the heat-recovery-type heat exchanger 15, etc., without making creative labor work, which thus fall within the protection scope of the present invention herein.

As schematically shown in FIG. 2 of the present invention, the present invention provides a port connection mode for four-way valves when the multi-way valve 12 includes two four-way valves. The multi-way valve 12 includes a first four-way valve 121 and a second four-way valve 122. An a1 port 1211 of the first four-way valve is connected with an outlet of the compressor 11. A b1 port 1212 of the first four-way valve is connected with the heat-recovery-type heat exchanger 15. A c1 port 1213 of the first four-way valve is connected with the inlet of the compressor 11. A d1 port 1214 of the first four-way valve is connected with an a1 port 1221 of the second four-way valve. A b1 port 1222 of the second four-way valve is connected with the first heat exchanger 13. A c1 port 1223 of the second four-way valve is connected with the inlet of the compressor 11. A d1 port 1224 of the second four-way valve is connected with the second heat exchanger 14. This connection mode specifically generates a flow path that reflects the essence of the present invention.

Preferably, a part of general electromagnetic valves can only guarantee the shutdown in a single direction. Thus, in order to ensure that the heat pump system of the present invention can be generally used, a fourth check valve 1610 and a fifth check valve 1611 may be further disposed between the first electromagnetic valve 1605 and the first three-way port 1601, and between the second electromagnetic valve 1606 and the third three-way port 1603 respectively. In this way, the corresponding flow path can be completely turned on or off by using the check values and the electromagnetic valves cooperatively.

Preferably, the heat pump system of the present invention requests different amount of refrigerants when running under a high working load and under a low working load, so that a liquid storage tank 1613 is respectively disposed on the flow path between each heat exchanger and the throttling element 1612 in the present invention to storage extra refrigerants.

Preferably, the liquid storage tank 1613 may be disposed on a pipeline between the throttling element 1612 and the four-way port 1604, so that one only liquid storage tank 1613 is needed for adjusting the flow rate of the refrigerant in different flow paths under four functional modes, thereby saving energy and being highly efficiently.

Preferably, a gas-liquid separator 17 is further disposed at the inlet of the compressor 11, to prevent the refrigerant in a liquid state from entering the compressor 11 and to avoid a liquid hammering phenomenon.

Preferably, in order to enable the throttling effects generated by the throttling element 1612 to be adjustable, an electronic expansion valve may be used as the throttling element 1612.

According to another aspect of the present invention, the present invention further provides an embodiment of a method for controlling multiple functional modes of a heat pump system. In a cooling mode, the first flow path of the mode-switching flow path 16 is turned on, and the second flow path, the third flow path, and the fourth flow path of the mode-switching flow path 16 are turned off. In this case, the cooling medium sequentially circulates through the outlet of the compressor 11, the multi-way valve 12, the first heat exchanger 13, the first flow path of the mode-switching flow path 16, the second heat exchanger 14, and the multi-way valve 12, and reaches the inlet of the compressor 11. And/or in a heating mode, the second flow path of the mode-switching flow path 16 is turned on, and the first flow path, the third flow path, and the fourth flow path of the mode-switching flow path 16 are turned off. In this case, the cooling medium sequentially circulates through the outlet of the compressor 11, the multi-way valve 12, the second heat exchanger 14, the second flow path of the mode-switching flow path 16, the first heat exchanger 13, and the multi-way valve 12, and reaches the inlet of the compressor 11. And/or in a heat recovery mode, the third flow path of the mode-switching flow path 16 is turned on, and the first flow path, the second flow path, and the fourth flow path of the mode-switching flow path 16 are turned off. In this case, the cooling medium sequentially circulates through the outlet of the compressor 11, the multi-way valve 12, the heat-recovery-type heat exchanger 15, the third flow path of the mode-switching flow path 16, the second heat exchanger 14, and the multi-way valve 12, and reaches the inlet of the compressor 11. And/or in a water heating mode, the fourth flow path of the mode-switching flow path 16 is turned on, and the first flow path, the second flow path, and the third flow path of the mode-switching flow path 16 are turned off. In this case, the cooling medium sequentially circulates through the outlet of the compressor 11, the multi-way valve 12, the heat-recovery-type heat exchanger 15, the fourth flow path of the mode-switching flow path 16, the first heat exchanger 13, and the multi-way valve 12, and reaches the inlet of the compressor 11.

Optionally, in the heat pump system 1 using the method for controlling multiple functional modes, the mode-switching flow path 16 is further disposed with a first electromagnetic valve 1605 and a second electromagnetic valve 1606. By means of controlling the first electromagnetic valve 1605 and/or the second electromagnetic valve 1606 to be powered on or off, the first flow path, the second flow path, the third flow path, and the fourth flow path of the mode-switching flow path 16 can be turned on and/or off.

According to the present invention, as schematically shown in FIG. 2, the present invention provides a method for controlling the first flow path, the second flow path, the third flow path, and the fourth flow path of the mode-switching flow path to be turned on and off.

When the heat pump system runs in a cooling mode, the first electromagnetic valve 1605 is powered off, and the second electromagnetic valve 1606 is powered on. The multi-way valve 12 is made into a first switching position by means of being powered on or off. Specifically, the first flow path of the mode-switching flow path is turned on, and the second flow path, the third flow path, and the fourth flow path of the mode-switching flow path are turned off. The cooling medium sequentially circulates through the first three-way port 1601, the first check valve 1607, the four-way port 1604, the throttling element 1612, the second three-way port 1602, the second electromagnetic valve 1606, and reaches the third three-way port 1603 within the mode-switching flow path.

And/or when the heat pump system runs in a heating mode, the first electromagnetic valve 1605 is powered on, and the second electromagnetic valve 1606 is powered off. The multi-way valve 12 is made into a second switching position by means of being powered on or off. Specifically, the second flow path of the mode-switching flow path is turned on, and the first flow path, the third flow path, and the fourth flow path of the mode-switching flow path are turned off. The cooling medium sequentially circulates through the third three-way port 1603, the second check valve 1608, the four-way port 1604, the throttling element 1612, the second three-way port 1602, and the first electromagnetic valve 1605, and reaches the first three-way port 1601 within the mode-switching flow path; and/or And/or when the heat pump system runs in a heat recovery mode, the first electromagnetic valve 1605 is powered off, and the second electromagnetic valve 1606 is powered on. The multi-way valve 12 is made into a third switching position by means of being powered on or off. Specifically, the third flow path of the mode-switching flow path is turned on, and the first flow path, the second flow path, and the fourth flow path of the mode-switching flow path are turned off. The cooling medium sequentially circulates through the third check valve 1609, the four-way port 1604, the throttling element 1612, the second three-way port 1602, and the second electromagnetic valve 1606, and reaches the third three-way port 1603 within the mode-switching flow path; and/or And/or when the heat pump system runs in a water heating mode, the first electromagnetic valve 1605 is powered on, and the second electromagnetic valve 1606 is powered off. The multi-way valve 12 is made into a fourth switching position by means of being powered on or off. Specifically, the fourth flow path of the mode-switching flow path is turned on, and the first flow path, the second flow path, and the third flow path of the mode-switching flow path are turned off. The cooling medium sequentially circulates through the third check valve 1609, the four-way port 1604, the throttling element 1612, the second three-way port 1602, and the first electromagnetic valve 1605, and reaches the first three-way port 1601 within the mode-switching flow path.

Optionally, the method for controlling multiple functional modes further includes a combined functional mode. The combined functional mode includes a preset condition, a first running mode, and a second running mode. The first running mode is any one of the cooling mode, the heating mode, the heat recovery mode, or the water heating mode. The second running mode is any other of the cooling mode, the heating mode, the heat recovery mode, or the water heating mode. When the heat pump system runs the combined functional mode, it runs the first running mode firstly, and then when the preset condition is satisfied, the system switches to run the second running mode.

According to the present invention, the present invention provides a specific method applying the combined functional mode, in which the combined functional mode is a heating and heat recovery mode. The first running mode is selected to be any one of the heating mode or the water heating mode, and the second running mode is selected to be any other one of the heating mode or the water heating mode. When the heat pump system runs the heating and heat recovery mode, it runs the first running mode firstly, and then when the preset condition is satisfied, the system switches to run the second running mode. For example, the system firstly runs the heating mode. Then, till a certain preset condition is satisfied, the system switches to run the water heating mode.

Optionally, the preset condition is that, when an air temperature and/or hot water temperature reaches a certain value, the system switches the functional mode. Specifically, a user sets the preset condition that when the water is heated to 65° C., the system switches to the heating mode, or when the ambient temperature within a water heating chamber reaches 27° C., the system switches to the heat recovery mode.

As schematically shown in FIG. 2, the present invention demonstrates a working principles and processes of a specific heat pump system applying the above controlling method.

When the heat pump system runs the cooling mode, the first electromagnetic valve 1605 is powered off, and the second electromagnetic valve 1606 is powered on. The first four-way valve 121 is turned on, and the second four-way valve 122 is turned off. A refrigerant at a high pressure and at a high temperature flows out of the outlet of the compressor 11, passes through the a1 port 1211 of the first four-way valve, the d1 port 1214 of the first four-way valve, the a2 port 1221 of the second four-way valve, and the b2 port 1222 of the second four-way valve, and reaches the first heat exchanger 13, for heat dissipation. Then, the refrigerant turns to be at a high pressure and at a medium temperature, which sequentially passes through the first three-way port 1601, the first check valve 1607, the four-way port 1604, and the throttling element 1612, thereby becoming the refrigerant at a low pressure and at a low temperature. Then, the refrigerant passes through the second three-way port 1602, the second electromagnetic valve 1606, and the third three-way port 1603, and reaches the second heat exchanger 14 for heat absorption. Then, the refrigerant turns to be at a lower pressure and at a lower temperature, which sequentially passes through the d2 port 1224 of the second four-way valve, the c2 port 1223 of the second four-way valve, and the gas-liquid separator 17, and then reaches the inlet of the compressor 11, thereby completing the cooling mode.

When the heat pump system runs the heating mode, the first electromagnetic valve 1605 is powered on, and the second electromagnetic valve 1606 is powered off. The first four-way valve 121 is powered on, and the second four-way valve 122 is powered on. The refrigerant at a high pressure and at a high temperature flows out of the outlet of the compressor 11, passes through the a1 port 1211 of the first four-way valve, the d1 port 1214 of the first four-way valve, the a2 port 1221 of the second four-way valve, and the d2 port 1224 of the second four-way valve, and reaches the second heat exchanger 14 for heat dissipation. Then, the refrigerant turns to be at a high pressure and at a medium temperature, which sequentially passes through the third three-way port 1603, the second check valve 1608, the four-way port 1604, and the throttling element 1612, thereby becoming the refrigerant at a low pressure and at a low temperature. Then, the refrigerant passes through the second three-way port 1602, the first electromagnetic valve 1605, and the first three-way port 1601, and reaches the first heat exchanger 13 for heat absorption. Then, the refrigerant turns to be at a lower pressure and at a lower temperature, which sequentially passes through the b2 port 1222 of the second four-way valve, the c2 port 1223 of the second four-way valve, and the gas-liquid separator 17, and reaches the inlet of the compressor 11, thereby completing the heating mode.

When the heat pump system runs the heat recovery mode, the first electromagnetic valve 1605 is powered off, and the second electromagnetic valve 1606 is powered on. The first four-way valve 121 is powered off, and the second four-way valve 122 is powered off. The refrigerant at a high pressure and at a high temperature flows out of the outlet of the compressor 11, passes through the a1 port 1211 of the first four-way valve, the b1 port 1212 of the first four-way valve, and reaches the heat-recovery-type heat exchanger 15 for heat dissipation. Then, the refrigerant turns to be at a high pressure and at a medium temperature, which sequentially passes through the third check valve 1609, the four-way port 1604, and the throttling element 1612, thereby becoming the refrigerant at a low pressure and at a low temperature. Then, the refrigerant passes through the second three-way port 1602, the second electromagnetic valve 1606, and the third three-way port 1603, and reaches the second heat exchanger 14 for heat absorption. Then, the refrigerant turns to be at a lower pressure and at a lower temperature, which sequentially passes through the d2 port 1224 of the second four-way valve, the c2 port 1223 of the second four-way valve, and the gas-liquid separator 17, and reaches the inlet of the compressor 11, thereby completing the heat recovery mode.

When the heat pump system runs the water heating mode, the first electromagnetic valve 1605 is powered on, and the second electromagnetic valve 1606 is powered off. The first four-way valve 121 is powered off, and the second four-way valve 122 is powered on. The refrigerant at a high pressure and at a high temperature flows out of the outlet of the compressor 11, passes through the a1 port 1211 of the first four-way valve, and the b1 port 1212 of the first four-way valve, and reaches the heat-recovery-type heat exchanger 15 for heat dissipation. Then, the refrigerant sequentially passes through the third check valve 1609, the four-way port 1604, and the throttling element 1612, thereby becoming the refrigerant at a low pressure and at a low temperature. Then, the refrigerant further passes through the second three-way port 1602, the first electromagnetic valve 1605, and the first three-way port 1601, and reaches the first heat exchanger 13 for heat absorption. Then, the refrigerant turns to be at a lower pressure and at a lower temperature, and sequentially passes through the b2 port 1222 of the second four-way valve, the c2 port 1223 of the second four-way valve, and the gas-liquid separator 17, and reaches the inlet of the compressor 11, thereby completing the water heating mode.

When the heat pump system runs the heating and heat recovery mode, the second electromagnetic valve 1606 is powered off, and the first electromagnetic valve 1605 is powered on. Firstly, the first four-way valve 121 and the second four-way valve 122 are powered on based on ON/OFF states in one of the heating mode or the water heating mode, that is, the heat pump system runs the heating mode or the water heating mode firstly, and once the condition set by the user is satisfied, the first four-way valve 121 and the second four-way valve 122 are powered on based on ON/OFF states in another one of the heating mode or the water heating mode, that is, the heat pump system further runs another one of the heating mode or the water heating mode.

Preferably, in the heating and heat recovery mode, the heat pump system recycles between two modes after the condition set by the user is satisfied.

Figure 3:
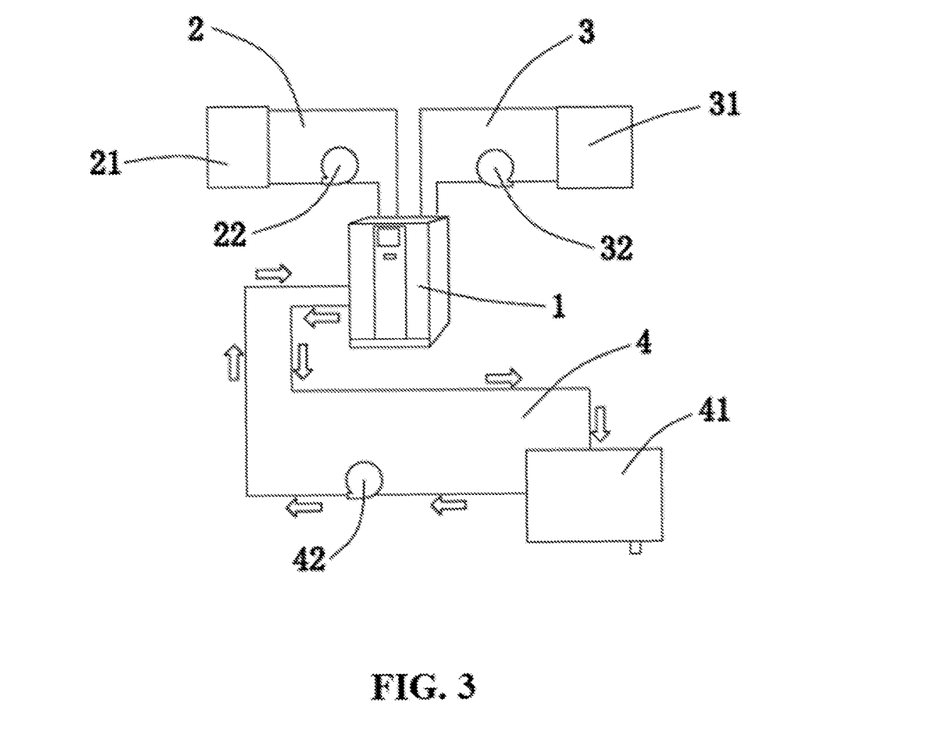
FIG. 3 is a schematic view of a heat pump unit according to the present invention.

According to another aspect of the present invention, the present invention further provides an embodiment of a heat pump unit. As shown in FIG. 3, the heat pump unit includes any one of the heat pump systems 1 mentioned in the above embodiments, and further includes an indoor side system 3, a water chamber system 4, and a heat-exchanging side system 2. The indoor side system 3 may be thermodynamically connected with the second heat exchanger 14 in the heat pump system 1 via a pipeline, for heat discharging or heat absorption, thereby adjusting the air used for cooling or heating effects in the indoor side. The water chamber system 4 is thermodynamically connected with the heat-recovery-type heat exchanger 15 in the heat pump system 1 via a pipeline, for heat absorption, thereby heating the water supplied to users in daily life. The heat-exchanging side system 2 is thermodynamically connected with the first heat exchanger 13 in the heat pump system 1 via a pipeline, for heat absorption or heat discharging, thereby bringing the unnecessary heats to the outdoor side, or taking the heat from the outdoor side.

Preferably, the indoor side system 3 includes a first water pump 32 and an indoor-side heat exchanger 31. The first water pump 32 is used for providing power for a heat-exchanging medium flowing within the pipeline. The indoor-side heat exchanger 31 is used for exchanging heat with the air at an indoor user side, thereby adjusting the air.

Preferably, the heat-exchanging side system 2 includes a second water pump 22 and a heat-exchanging side heat exchanger 21. The second water pump 22 is used for providing power for the heat exchanging medium flowing within the pipeline. The heat-exchanging side heat exchanger 21 is used for exchanging heat with a ground source or water source or air source at an outdoor side, thereby discharging or absorbing heat.

Preferably, the water chamber system 4 includes a third water pump 42 and a water chamber 41. The third water pump 42 is used for providing power for water flowing within the pipeline. After the above heat exchanging process, the water in the water chamber 41 returns to the water chamber 41 for being used by users.

On one hand, the above heat pump unit has a smaller amount of outdoor parts and elements, in which the pipelines are laid simply, so that it has a lower cost of both engineering and the parts and elements. On the other hand, the domestic water in the water chamber 41 can directly exchange heat with the heat-recovery-type heat exchanger 15, which increases the temperature of the domestic water finally used by users in daily life, generally 65° C., compared with the system in the prior art requesting multiple set of water systems for heat exchanging, thereby enlarging the temperature scope of the domestic water for being selected by the users.

What are described in the specification are preferred embodiments of the present invention, and the embodiments are only used for describing the technical solution of the present invention instead of limiting the present invention. Technical solutions that can be made by persons skilled in the art according to the present invention through logic analysis, ratiocination or limited experiment should all fall within the scope of the present invention.

The invention claimed is:
1. A heat pump system, comprising:
a compressor, a first heat exchanger, a second heat exchanger, a heat-recovery-type heat exchanger, a multi-way valve, and a throttling element, wherein any flow path between any two of the first heat exchanger, the second heat exchanger, and the heat-recovery-type heat exchanger is disposed with the throttling element; further comprising:

a mode-switching flow path, having a first flow path, a second flow path, a third flow path, and a fourth flow path, wherein each of the flow paths is controllably turned on or off to implement a different functional mode, wherein the different functional modes include at least one of, a cooling mode, a cooling medium sequentially circulates through an outlet of the compressor, the multi-way valve, the first heat exchanger, the first flow path of the mode-switching flow path, the second heat exchanger, and the multi-way valve, and reaches an inlet of the compressor; and a heating mode, the cooling medium sequentially circulates through the outlet of the compressor, the multi-way valve, the second heat exchanger, the second flow path of the mode-switching flow path, the first heat exchanger, and the multi-way valve, and reaches the inlet of the compressor; and a heat recovery mode, the cooling medium sequentially circulates through the outlet of the compressor, the multi-way valve, the heat-recovery-type heat exchanger, the third flow path of the mode-switching flow path, the second heat exchanger, and the multi-way valve, and reaches the inlet of the compressor; and a water heating mode, the cooling medium sequentially circulates through the outlet of the compressor, the multi-way valve, the heat-recovery-type heat exchanger, the fourth flow path of the mode-switching flow path, the first heat exchanger, and the multi-way valve, and reaches the inlet of the compressor;

wherein the mode-switching flow path comprises a first three-way port, a second three-way port, a third three-way port, and a four-way port, and the throttling element is disposed within the mode-switching flow path.

2. The heat pump system according to claim 1, wherein
the first flow path of the mode-switching flow path is a flow path from the first three-way port to the third three-way port through the throttling element; and
the second flow path of the mode-switching flow path is a flow path from the third three-way port to the first three-way port through the throttling element; and
the third flow path of the mode-switching flow path is a flow path from the four-way port to the third three-way port through the throttling element; and
the fourth flow path of the mode-switching flow path is a flow path from the four-way port to the first three-way port through the throttling element.

3. The heat pump system according to claim 2, wherein
the first flow path of the mode-switching flow path is a flow path staring from the first three-way port, passing through the four-way port, the throttling element, and the second three-way port, and reaching the third three-way port; and
the second flow path of the mode-switching flow path is a flow path starting from the third three-way port, passing through the four-way port, the throttling element, and the second three-way port, and reaching the first three-way port; and
the third flow path of the mode-switching flow path is a flow path starting from the four-way port, passing through the throttling element and the second three-way port, and reaching the third three-way port; and
the fourth flow path of the mode-switching flow path is a flow path starting from the four-way port, passing through the throttling element and the second three-way port, and reaching the first three-way port.

4. The heat pump system according to claim 3, wherein a first end of the first three-way port is connected with the first heat exchanger, a second end of the first three-way port is connected with a first end of the second three-way port via a first electromagnetic valve, and a third end of the first three-way port is connected with a first end of the four-way port via a first check valve; a second end of the second three-way port is connected with a first end of the third three-way port via a second electromagnetic valve, and a third end of the second three-way port is connected with a third end of the four-way port via the throttling element; a second end of the third three-way port is connected with the second heat exchanger, and a third end of the third three-way port is connected with a second end of the four-way port by a second check valve; and a fourth end of the four-way port is connected with the heat-recovery-type heat exchanger via a third check valve.

5. The heat pump system according to claim 4, wherein a fourth check valve is disposed between the first electromagnetic valve and the second end of the first three-way port; and/or a fifth check valve is disposed between the second electromagnetic valve and the first end of the third three-way port.

6. The heat pump system according to claim 5, wherein a liquid storage tank is disposed between the throttling element and the third end of the four-way port.

7. The heat pump system according to claim 5, wherein a gas-liquid separator is disposed between the multi-way valve and the inlet of the compressor.

8. The heat pump system according to claim 5, wherein the throttling element is an electronic expansion valve.

9. The heat pump system according to claim 1, wherein
the multi-way valve has a first switching position, a second switching position, a third switching position, and a fourth switching position;
in the first switching position, the multi-way valve respectively communicates the outlet of the compressor with the first heat exchanger, and communicates the inlet of the compressor with the second heat exchanger, and
in the second switching position, the multi-way valve respectively communicates the outlet of the compressor with the second heat exchanger, and communicates the inlet of the compressor with the first heat exchanger; and
in the third switching position, the multi-way valve respectively communicates the outlet of the compressor with the heat-recovery-type heat exchanger, and communicates the inlet of the compressor with the second heat exchanger; and
in the fourth switching position, the multi-way valve respectively communicates the outlet of the compressor with the heat-recovery-type heat exchanger; and communicates the inlet of the compressor with the first heat exchanger.

10. The heat pump system according to claim 9, wherein
the multi-way valve comprises a first four-way valve and a second four-way valve that are serially connected with each other;
in the first switching position, the first four-way valve and the second four-way valve communicate the outlet of the compressor with the first heat exchanger, and communicate the inlet of the compressor with the second heat exchanger; and in the second switching position, the first four-way valve and the second four-way valve communicate the outlet of the compressor with the second heat exchanger, and communicate the inlet of the compressor with the first heat exchanger; and in the third switching position, the first four-way valve and the second four-way valve communicate the outlet of the compressor with the heat-recovery-type heat exchanger, and communicate the inlet of the compressor with the second heat exchanger; and in the fourth switching position, the first four-way valve and the second four-way valve communicate the outlet of the compressor with the heat-recovery-type heat exchanger, and communicate the inlet of the compressor with the first heat exchanger.

11. A heat pump system, comprising:

a compressor, a first heat exchanger, a second heat exchanger, a heat-recovery-type heat exchanger, a multi-way valve, and a throttling element, wherein any flow path between any two of the first heat exchanger, the second heat exchanger, and the heat-recovery-type heat exchanger is disposed with the throttling element, the heat pump system operable in modes including:

a cooling mode, wherein a cooling medium sequentially circulates through an outlet of the compressor, the multi-way valve, the first heat exchanger, the second heat exchanger, and the multi-way valve, and reaches an inlet of the compressor;

a heating mode, wherein the cooling medium sequentially circulates through the outlet of the compressor, the multi-way valve, the second heat exchanger, the first heat exchanger, and the multi-way valve, and reaches the inlet of the compressor; ad a heat recovery mode, the cooling medium sequentially circulates through the outlet of the compressor, the multi-way valve, the heat-recovery-type heat exchanger, the second heat exchanger, and the multi-way valve, and reaches the inlet of the compressor; and a water heating mode, wherein the cooling medium sequentially circulates through the outlet of the compressor, the multi-way valve, the heat-recovery-type heat exchanger, the first heat exchanger, and the multi-way valve, and reaches the inlet of the compressor;

wherein the multi-way valve has a first switching position, a second switching position, a third switching position, and a fourth switching position;

in the first switching position, the multi-way valve respectively communicates the outlet of the compressor with the first heat exchanger, and communicates the inlet of the compressor with the second heat exchanger, and in the second switching position, the multi-way valve respectively communicates the outlet of the compressor with the second heat exchanger, and communicates the inlet of the compressor with the first heat exchanger; and in the third switching position, the multi-way valve respectively communicates the outlet of the compressor with the heat-recovery-type heat exchanger, and communicates the inlet of the compressor with the second heat exchanger; and in the fourth switching position, the multi-way valve respectively communicates the outlet of the compressor with the heat-recovery-type heat exchanger; and communicates the inlet of the compressor with the first heat exchanger;

wherein the multi-way valve comprises a first four-way valve and a second four-way valve that are serially connected with each other;

in the first switching position, the first four-way valve and the second four-way valve communicate the outlet of the compressor with the first heat exchanger, and communicate the inlet of the compressor with the second heat exchanger; and in the second switching position, the first four-way valve and the second four-way valve communicate the outlet of the compressor with the second heat exchanger, and communicate the inlet of the compressor with the first heat exchanger; and in the third switching position, the first four-way valve and the second four-way valve communicate the outlet of the compressor with the heat-recovery-type heat exchanger, and communicate the inlet of the compressor with the second heat exchanger; and in the fourth switching position, the first four-way valve and the second four-way valve communicate the outlet of the compressor with the heat-recovery-type heat exchanger, and communicate the inlet of the compressor with the first heat exchanger;

the first four-way valve has an a1 port, a b1 port, a c1 port, and a d1 port, and the second four-way valve has an a2 port, a b2 port, a c2 port, and a d2 port; the a1 port is connected with the outlet of the compressor, the b1 port is connected with the heat-recovery-type heat exchanger, the c1 port is connected with the inlet of the compressor, the d1 port is connected with the a2 port, the b2 port is connected with the first heat exchanger, the c2 port is connected with the inlet of the compressor, and the d2 port is connected with the second heat exchanger;

in the first switching position, the a1 port is communicated with the d1 port, the b1 port is communicated with the c1 port, the a2 port is communicated with the b2 port, and the c2 port is communicated with the d2 port; and in the second switching position, the a1 port is communicated with the d1 port, the b1 port is communicated with the c1 port, the a2 port is communicated with the d2 port, and the b2 port is communicated with the c2 port; and in the third switching position, the a1 port is communicated with the b1 port, the c1 port is communicated with the d1 port, the a2 port is communicated with the b2 port, and the c2 port is communicated with the d2 port; and in the fourth switching position, the a1 port is communicated with the d1 port, the b 1 port is communicated with the c 1 port, the a2 port is communicated with the d2 port, and the b2 port is communicated with the c2 port.

12. A heat pump unit, comprising the heat pump system according to claim 1, and further comprising an indoor side system, a water chamber system, and a heat-exchanging side system; wherein the indoor side system, the water chamber system, and the heat-exchanging side system are thermodynamically connected with the heat pump system via pipelines respectively.

13. The heat pump unit according to claim 12, wherein the indoor side system comprises a first water pump and an indoor-side heat exchanger, and the indoor-side heat exchanger and the first water pump are thermodynamically connected with the second heat exchanger via pipelines.

14. The heat pump unit according to claim 12, wherein the heat-exchanging side system comprises a second water pump and a heat-exchanging side heat exchanger, and the heat-exchanging side heat exchanger and the second water pump are thermodynamically connected with the first heat exchanger via pipelines.

15. The heat pump unit according to claim 12, wherein the water chamber system comprises a third water pump and a water chamber, and the water chamber and the third water pump are thermodynamically connected with the heat-recovery-type heat exchanger via pipelines.

16. A method for controlling multiple functions mode for a heat pump system, wherein
the heat pump system comprises a compressor, a first heat exchanger, a second heat exchanger, a heat-recovery-type heat exchanger, a multi-way valve, a throttling element, and a mode-switching flow path; any flow path between any two of the first heat exchanger, the second heat exchanger, and the heat-recovery-type heat exchanger is disposed with the throttling element; and the mode-switching flow path is disposed with a first flow path, a second flow path, a third flow path, and a fourth flow path, when the heat pump system runs in at least one mode including;
a cooling mode, the first flow path of the mode-switching flow path is turned on, and the second flow path, the third flow path, and the fourth flow path of the mode-switching flow path are turned off; in this case, a cooling medium sequentially circulates through an outlet of the compressor, the multi-way valve, the first heat exchanger, the first flow path of the mode-switching flow path, the second heat exchanger, and the multi-way valve, and reaches an inlet of the compressor; and
a heating mode, the second flow path of the mode-switching flow path is turned on, and the first flow path, the third flow path, and the fourth flow path of the mode-switching flow path are turned off; in this case, the cooling medium sequentially circulates through the outlet of the compressor, the multi-way valve, the second heat exchanger, the second flow path of the mode-switching flow path, the first heat exchanger, and the multi-way valve, and reaches the inlet of the compressor; and
a heat recovery mode, the third flow path of the mode-switching flow path is turned on, and the first flow path, the second flow path, and the fourth flow path of the mode-switching flow path are turned off; in this case, the cooling medium sequentially circulates through the outlet of the compressor, the multi-way valve, the heat-recovery-type heat exchanger, the third flow path of the mode-switching flow path, the second heat exchanger, and the multi-way valve, and reaches the inlet of the compressor; and
a water heating mode, the fourth flow path of the mode-switching flow path is turned on, and the first flow path, the second flow path, and the third flow path of the mode-switching flow path are turned off; in this case, the cooling medium sequentially circulates through the outlet of the compressor, the multi-way valve, the heat-recovery-type heat exchanger, the fourth flow path of the mode-switching flow path, the first heat exchanger, and the multi-way valve, and reaches the inlet of the compressor;
wherein the mode-switching flow path is further disposed with a first electromagnetic valve and a second electromagnetic valve;
when the first electromagnetic valve is powered off, the second electromagnetic valve is powered on, and the multi-way valve is switched to a first switching position, the first flow path of the mode-switching flow path is turned on, and the second flow path, the third flow path, and the fourth flow path of the mode-switching flow path are turned off; and
when the second electromagnetic valve is powered off, the first electromagnetic valve is powered on, and the multi-way valve is switched to a second switching position, the second flow path of the mode-switching flow path is turned on, and the first flow path, the third flow path, and the fourth flow path of the mode-switching flow path are turned off; and
when the first electromagnetic valve is powered off, the second electromagnetic valve is powered on, and the multi-way valve is switched to a third switching position, the third flow path of the mode-switching flow path is turned on, and the first flow path, the second flow path, and the fourth flow path of the mode-switching flow path are turned off; and
when the second electromagnetic valve is powered off, the first electromagnetic valve is powered on, and the multi-way valve is switched to a fourth switching position, the fourth flow path of the mode-switching flow path is turned on, and the first flow path, the second flow path, and the third flow path of the mode-switching flow path are turned off.

17. The method for controlling multiple functions modes for the heat pump system according to claim 16, wherein
the mode-switching flow path comprises a first three-way port, a second three-way port, a third three-way port, and a four-way port; a first end of the first three-way port is connected with the first heat exchanger, a second end of the first three-way port is connected with a first end of the second three-way port via the first electromagnetic valve, and a third end of the first three-way port is connected with a first end of the four-way port via a first check valve; a second end of the second three-way port is connected with a first end of the third three-way port via the second electromagnetic valve, and a third end of the second three-way port is connected with a third end of the four-way port via the throttling element; a second end of the third three-way port is connected with the second heat exchanger, and a third end of the third three-way port is connected with a second end of the four-way port via a second check valve; and a fourth end of the four-way port is connected with the heat-recovery-type heat exchanger via a third check valve;
when the first flow path of the mode-switching flow path is turned on, and the second flow path, the third flow path, and the fourth flow path of the mode-switching flow path are turned off, the cooling medium sequentially circulates through the first three-way port, the first check valve, the four-way port, the throttling element, the second three-way port, and the second electromagnetic valve, and reaches the third three-way port in the mode-switching flow path; and/or
when the second flow path of the mode-switching flow path is turned on, and the first flow path, the third flow path, and the fourth flow path of the mode-switching flow path are turned off, the cooling medium sequentially circulates through the third three-way port, the second check valve, the four-way port, the throttling element, the second three-way port, and the first electromagnetic valve, and reaches the first three-way port in the mode-switching flow path; and/or when the third flow path of the mode-switching flow path is turned on, and the first flow path, the second flow path, and the fourth flow path of the mode-switching flow path are turned off, the cooling medium sequentially circulates through the third check valve, the four-way port, the throttling element, the second three-way port, and the second electromagnetic valve, and reaches the third three-way port in the mode-switching flow path; and/or when the fourth flow path of the mode-switching flow path is turned on, and the first flow path, the second flow path, and the third flow path of the mode-switching flow path are turned off, the cooling medium sequentially circulates through the third check valve, the four-way port, the throttling element, the second three-way port, the first electromagnetic valve, and reaches the first three-way port in the mode-switching flow path.

18. The method for controlling multiple functions modes for the heat pump system according to claim 16, further comprising a combined functional mode, wherein the combined functional mode comprises a preset condition, a first running mode, and a second running mode; the first running mode is any one of the cooling mode, the heating mode, the heat recovery mode, or the water heating mode; and the second running mode is any other of the cooling mode, the heating mode, the heat recovery mode, or the water heating mode;

when the heat pump system runs the combined functional mode, the heat pump system runs the first running mode firstly, and then when the preset condition is satisfied, the heat pump system switches to run the second running mode.

19. The method for controlling multiple functions modes for the heat pump system according to claim 18, wherein the combined functional mode comprises a heating and heat recovery mode, the first running mode is any one of the heating mode or the water heating mode, and the second running mode is another one of the heating mode or the water heating mode;

when the heat pump system runs the heating and heat recovery mode, the heat pump system runs the first running mode firstly, and then, when the preset condition is satisfied, the heat pump system switches to the second running mode.

20. The method for controlling multiple functions modes for the heat pump system according to claim 18, wherein the preset condition is at least one of that an air temperature and the hot water temperature is higher than or equals to a preset value.

* * * * *